(12) United States Patent
Janson et al.

(10) Patent No.: US 6,561,949 B2
(45) Date of Patent: May 13, 2003

(54) COUPLING ASSEMBLY AND A METHOD FOR ACCELERATING A VEHICLE AND OPERATING A TRANSMISSION UTILIZING THE COUPLING ASSEMBLY

(75) Inventors: David Allen Janson, Plymouth, MI (US); Charles Edward Marshall, Novi, MI (US); Alvin Henry Berger, Brownstown, MI (US); Ronald Thomas Cowan, Rochester Hills, MI (US); Gregory Daniel Goleski, Warren, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 0 days.

(21) Appl. No.: 09/783,350

(22) Filed: Feb. 14, 2001

(65) Prior Publication Data

US 2002/0111249 A1 Aug. 15, 2002

(51) Int. Cl.[7] .............................................. B60K 41/04
(52) U.S. Cl. .......................... 477/90; 477/91; 477/124; 192/21.5; 192/48.2; 74/339

(58) Field of Search ................................ 477/83, 84, 90, 477/91, 124; 192/21.5, 48.8, 48.2, 30 V; 74/339

(56) References Cited

U.S. PATENT DOCUMENTS

| | | | | | |
|---|---|---|---|---|---|
| 4,445,601 A | * | 5/1984 | Hofbauer et al. | ........... | 180/165 |
| 4,777,843 A | * | 10/1988 | Bopp | .......................... | 182/163 |
| 5,007,303 A | * | 4/1991 | Okuzumi | ..................... | 188/267 |
| 5,142,943 A | * | 9/1992 | Hughes | ........................ | 192/49 |
| 5,409,432 A | * | 4/1995 | Steeby | ......................... | 477/71 |
| 6,012,559 A | * | 1/2000 | Yamamoto | ................. | 192/30 V |
| 6,319,173 B1 | * | 11/2001 | Patel et al. | .................. | 477/176 |

\* cited by examiner

Primary Examiner—Rodney H. Bonck
Assistant Examiner—Eric M. Williams
(74) Attorney, Agent, or Firm—Frank G. McKenzie

(57) ABSTRACT

A coupling assembly 10 which selectively causes a primary mass or flywheel 20 be engaged or be coupled to a crankshaft 18 as a transmission gear assembly 23 moves from a first gear position to a second gear position and which further selectively causes the primary mass or flywheel 20 to be disengaged or disconnected from the crankshaft 18 as the vehicle is accelerated from an idle state, effective to decrease or substantially eliminate acceleration lag.

5 Claims, 2 Drawing Sheets

US 6,561,949 B2

COUPLING ASSEMBLY AND A METHOD FOR ACCELERATING A VEHICLE AND OPERATING A TRANSMISSION UTILIZING THE COUPLING ASSEMBLY

FIELD OF THE INVENTION

The present invention generally relates to a coupling assembly and to a method for accelerating a vehicle and operating a transmission utilizing the coupling assembly and more particularly, to a coupling assembly which selectively reduces vehicular inertia and/or selectively slows the speed of an engine, effective to increase the responsiveness of a vehicle and to allow the transmission to be smoothly operated.

BACKGROUND OF THE INVENTION

There typically exists a certain amount of time between a depression of a vehicular accelerator pedal or member and an acceleration or movement of the vehicle, especially when the vehicle is accelerated or "launched" from rest or an idle state. This lag, often referred to as "acceleration lag", may be more noticeable (e.g., has a relatively large amount of time) with vehicles having an automated shift manual transmission assembly or an "ASM" type transmission assembly which causes and/or requires an engine to have a speed of about 800 revolutions per minute in the idle state and which further requires the engine to attain a speed of about 2000 rpm before acceleration actually begins. In order to allow the relatively stable speed of about 800 rpm to be obtained, at idle, a certain amount of vehicle inertia is required (e.g., a certain amount of inertial mass is applied and/or coupled to the vehicle's crankshaft). The amount of time required for the engine to operatively obtain the speed of 2000 rpm, from its idle speed, is therefore the "lag time".

Further, oftentimes a shift in gear positions of an "ASM" type transmission assembly, especially a shift from a first lower gear to a second higher gear (e.g., an "upshift"), causes an undesirable movement (e.g., a "jerking") of the vehicle which is readily perceptible and annoying to the driver, especially since such shifting "automatically" occurs without the need for the driver to physically manipulate a typical or conventional clutch member. Such "jerking" is typically caused by a torque break, within the ASM transmission assembly, which occurs after the gear shift operation is initiated and continues until the gear shift operation is completed. The duration of time that the torque break occurs during such a gear shift operation is referred to as a "torque break interval" and a relatively long torque break interval causes this undesirable "jerking".

It is desirable to provide an assembly and methods which utilize the provided assembly to improve vehicle launch (e.g., to reduce or substantially eliminate "lag") while concomitantly allowing the transmission to be smoothly shifted (e.g., preventing and/or substantially eliminating the undesired vehicle movement or "jerking" associated with a shift in gear positions).

SUMMARY OF THE INVENTION

It is first non-limiting advantage of the present invention to provide an assembly which selectively reduces vehicular inertia, such as and without limitation the amount of inertia which is applied to a crankshaft.

It is a second non-limiting advantage of the present invention to provide an assembly which selectively reduces the speed of an engine, effective to allow a transmission to smoothly transition between a first and a second gear position.

It is a third non-limiting advantage to provide a method for reducing the lag associated with the launch of a vehicle.

According to a first aspect of the present invention, an assembly for use with a vehicle of the type having a crankshaft is provided. The assembly includes a member which may be selectively coupled to the crankshaft; and an assembly which selectively disconnects the member from the crankshaft as the vehicle is accelerated.

According to a second aspect of the present invention, a method is provided for reducing acceleration lag of a vehicle having a certain amount of inertia. The method includes the steps of reducing the certain amount of inertia as the vehicle is launched.

According to a third aspect of the present invention a method for use with a vehicle of the type having an engine which may be selectively operated at a certain speed and a transmission which may be selectively moved from a first gear position to a second gear position is provided. The method is effective to allow the transmission to smoothly move from said first gear position to said second gear position and includes the step of slowing said certain speed of said engine before said transmission is moved from said first gear position to said second gear position.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
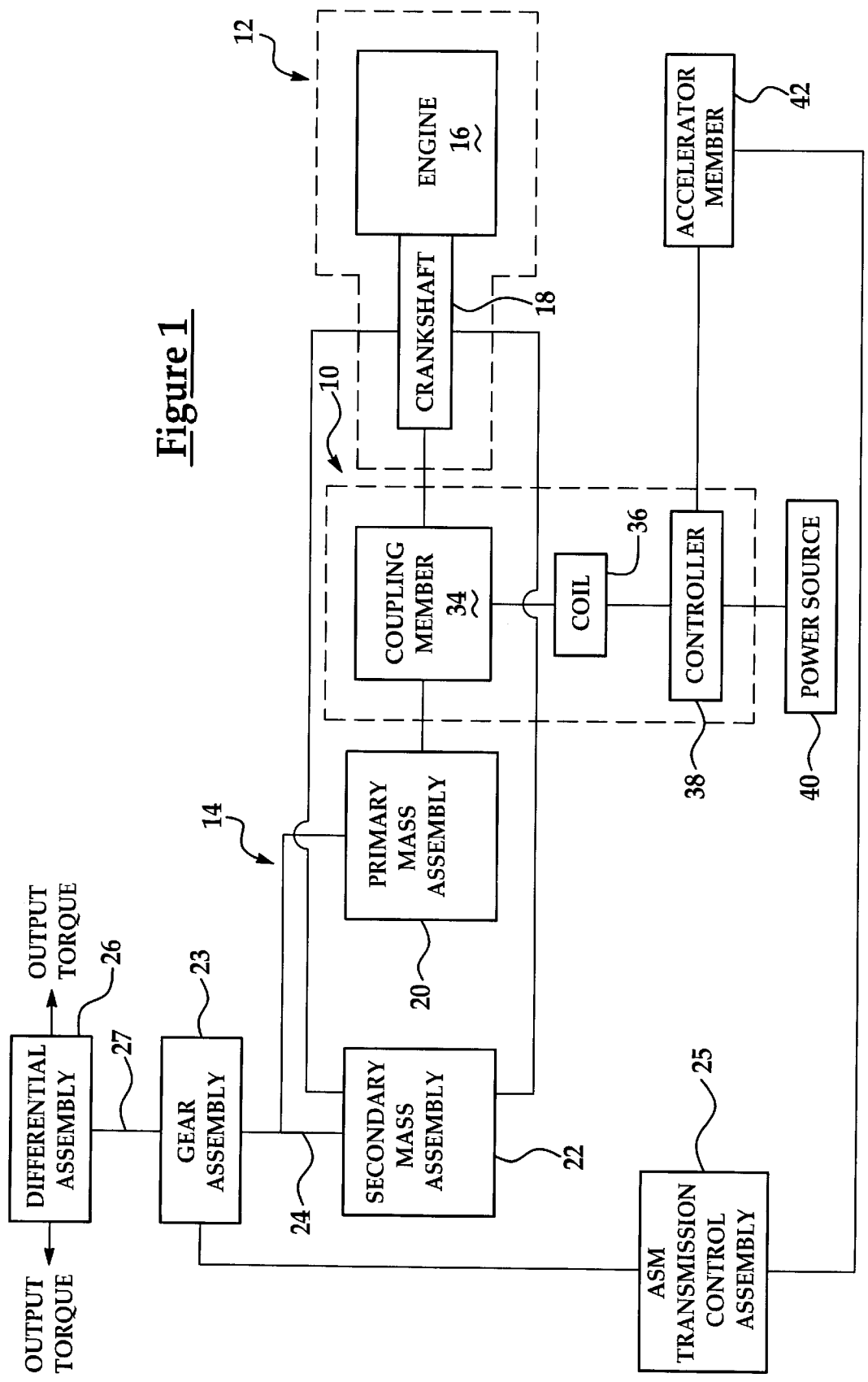
FIG. 1 is a block diagram of a coupling assembly which is made in accordance with the teachings of the preferred embodiment of the invention in combination with a vehicular engine and automatic shift manual transmission assembly.
Figure 2:
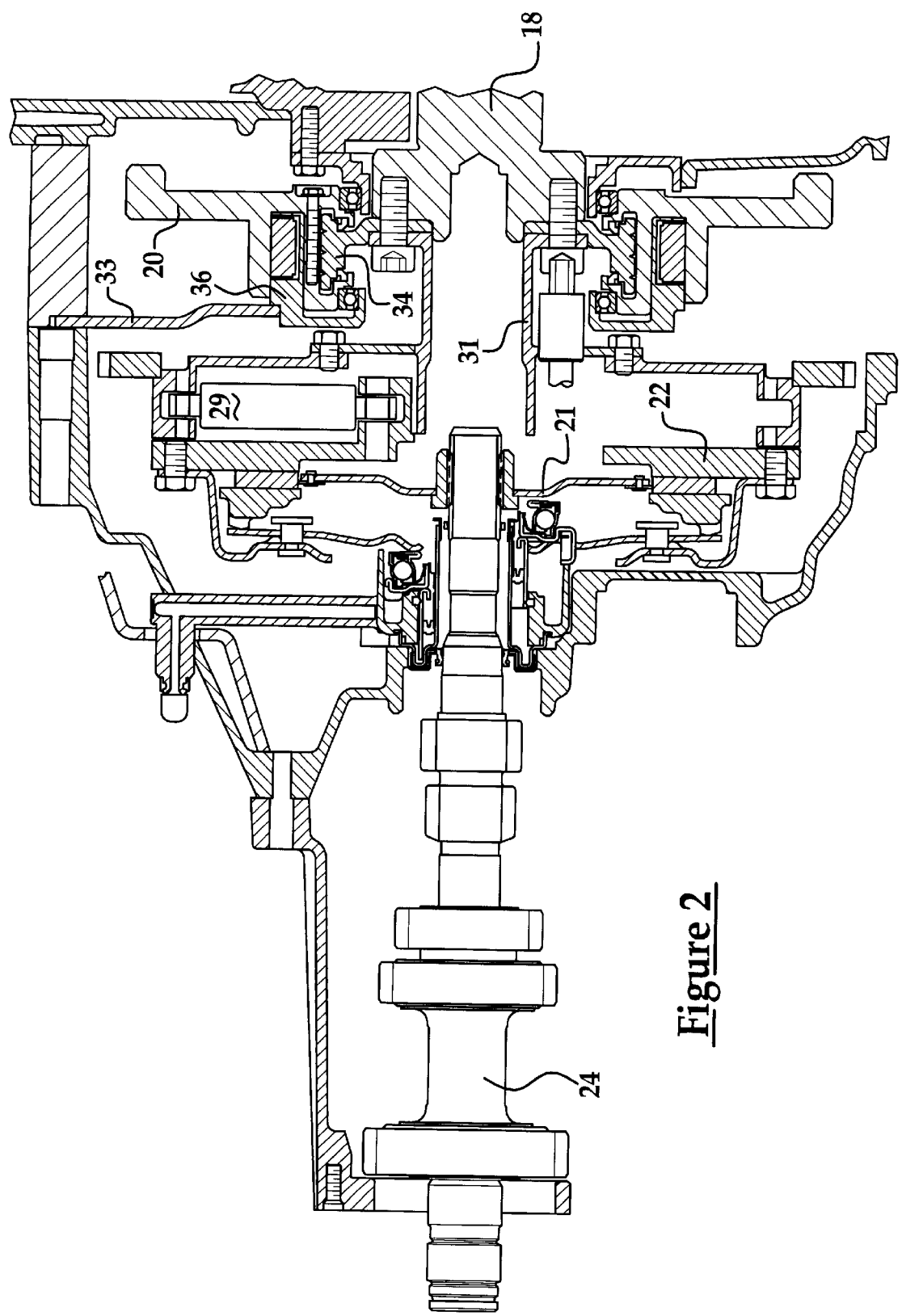
FIG. 2 is a partial sectional view of the coupling assembly and vehicular transmission assembly which are shown in FIG. 1.

Referring now to FIGS. 1 and 2, there is shown a coupling assembly 10 which is made in accordance with the teachings of the preferred embodiment of the invention in combination with a vehicular engine assembly 12 and an automated shift manual transmission assembly 14.

As shown, vehicular engine assembly 12 includes an engine 16 which may be an internal combustion type or a hybrid type, in combination with a crankshaft 18. Crankshaft 18 is physically coupled to the engine 16 and the engine 16 generates torque type energy which is communicated to the crankshaft 18, effective to cause the crankshaft to rotate.

Transmission assembly 14 includes, in one non-limiting embodiment, a primary mass assembly or flywheel 20 which may be selectively and physically coupled to the crankshaft 18 in the manner and for one or more purposes which are more fully delineated below, a secondary mass assembly 22 which includes a spring assembly 29 and which is physically coupled to the crankshaft 18, a selectively positionable gear assembly 23, a shaft 24 which is physically coupled to the secondary mass assembly 22 by use of clutch assembly 21 and which is further coupled to the gear assembly 23, and a differential assembly 26 which is physically coupled to the gear assembly 23 by an output shaft member 27. As shown best in FIG. 2, primary mass assembly member 20 is coupled to the shaft 24 through hub 31.

Transmission assembly 14 further includes an automated shift manual transmission control assembly 25 which is coupled to the gear assembly 23 and to the acceleration member or pedal 42, and which, as should be apparent to those skilled in the art, is effective to cause gear assembly 23 to move from a first gear position to a second gear position in response to the movement of the accelerator member 42.

In normal operation, torque energy is communicated from the crankshaft 18 to the primary mass assembly or flywheel 20 and to the secondary mass assembly 22. The received energy is then communicated to the shaft 24 and then to the differential assembly 26. The differential assembly 26 then communicates the received energy to the wheels of the vehicle (not shown), effective to allow the vehicle to be selectively moved and driven.

As is further shown in FIGS. 1 and 2, the coupling assembly 10 includes a coupling member or assembly 34 which is physically coupled to the primary mass member or flywheel 20, an electric coil 36 which is physically coupled to the member 33, and a controller 38 which is operable under stored program control and which is physically coupled to the coil 36. The controller 38 is physically coupled to a source of energy 40 (e.g., a vehicle battery) and to the accelerator pedal or member 42. It should be appreciated that the coupling member or assembly 34 may comprise a magnetic clutch assembly or substantially any conventional and/or commercially available coupling assembly or member, such as and without limitation, an eddy current clutch.

In operation, controller 38 senses a depression of the accelerator pedal or member 42 from rest or a "vehicle idle or stationary state". Such a depression indicates a desired launch or acceleration of the vehicle. Controller 38, upon sensing such a desired launch or acceleration, allows energy to be communicated to or interrupted from the power source 40 to the electric coil 36, effective to energize or de-energize the coil 36 and cause the coupling member or assembly 34 to physically isolate or disengage the primary mass member or flywheel 20 from the crankshaft 18, thereby reducing the amount of inertia within the vehicle (e.g., reducing the amount of inertial mass which is applied to the crankshaft 18) and reducing the amount of acceleration lag by allowing engine 16 to attain a speed of about 2000 rpm faster than in conventional vehicles having a relatively large amount of inertia. This, coupling member or assembly 34, may be either "normally open" or "normally closed" and is therefore effective to increase the responsiveness of the vehicle by reducing the amount of acceleration lag.

The controller 38 further senses movement of the accelerator pedal or member 42, indicative of a desired change of speed of the vehicle which necessitates a movement of the gear assembly 23 from a first gear position to a second gear position. Before such shifting is accomplished, controller 38, by use of the coil 36 and the power source 40, causes the coupling member or assembly 34 to connect the primary mass member or flywheel 20 to the crankshaft 18, thereby slowing the speed of the engine 16 and allowing the gear shift to more smoothly occur by reducing the torque break shift interval.

It is to be understood that the invention is not limited to the exact construction or method which has been illustrated and discussed above, but that various changes and modifications may be made without departing from the spirit and the scope of the invention as is more fully delineated in the following claims.

What is claimed is:

1. A method for use with a vehicle of the type having an engine having a crankshaft which may be selectively operated at a certain speed and a transmission which may be selectively moved from a first gear position to a second gear position, said method being effective to allow the transmission to smoothly move from said first gear position to said second gear position, said method comprising the steps of:

providing a certain mass;

providing a clutch and coupling said clutch to said crankshaft;

using said clutch to selectively couple said certain mass to said crankshaft; and slowing said certain speed of said engine as said transmission is moved from said first gear position to said second gear position by said selective coupling of said certain mass to said crankshaft.

2. The method of claim 1 wherein said certain mass comprises a flywheel.

3. The method of claim 2 further comprising the steps of providing a secondary mass assembly; and fixedly attaching the secondary mass to said crankshaft.

4. The method of claim 3 wherein said clutch comprises a magnetic clutch.

5. The method of claim 3 wherein said clutch comprises an eddy current clutch.

\* \* \* \* \*